United States Patent
Fogman et al.

[15] 3,650,889
[45] Mar. 21, 1972

[54] POLLUTION CONTROLLED POLYSULFIDE RECOVERY PROCESS

[72] Inventors: Carl Bertil Fogman, Westfield, N.J.; Hugh Wharton Nelson, West Hartford, Conn.; Utah Tsao, Jersey City, N.J.

[73] Assignees: Combustion Engineering, Inc., Windsor, Conn. by said Hugh Wharton Nelson; The Lummus Company, Bloomfield, N.J., by said Carl Bertil Fogman and Utah Tsao

[22] Filed: Aug. 3, 1970

[21] Appl. No.: 60,568

[52] U.S. Cl.....................................162/30, 23/48, 23/181, 23/225
[51] Int. Cl.........................................D21c 11/04
[58] Field of Search...............162/30, 38, 29, 36; 23/225 R, 23/48, 49, 63, 181

[56] References Cited

UNITED STATES PATENTS

| | | | |
|---|---|---|---|
| 3,525,666 | 8/1970 | Brannland | 162/30 |
| 3,077,488 | 2/1963 | Mercier | 23/225 R X |
| 3,068,065 | 12/1962 | Hartley | 23/225 R X |

Primary Examiner—S. Leon Bashore
Assistant Examiner—Thomas G. Scavone
Attorney—Carlton F. Bryant, Eldon H. Luther, Robert L. Olson, John F. Carney, Richard H. Berneike, Edward L. Kochey, Jr. and Lawrence P. Kessler

[57] ABSTRACT

A chemical recovery process for a polysulfide paper pulping system is described. After the polysulfide digestion, the pulp washing is carried 3. in an essentially oxygen-free environment to minimize the oxidation of NaSH. about spent liquor is then pre-evaporated, makeup with a recycle stream of liquor containing $Na_2CO_3$ and $NaHCO_3$ and subjected to a soap skimming operation. The mixture is next carbonated to convert $Na_2CO_3$ to $NaHCO_3$ and stripped to release $H_2S$. The stripping and carbonation are accomplished by passing flue gas through the stripping tower and the carbonating tower. The $H_2S$ is converted to sulfur by the use of a liquid catalyst and the formed sulfur is then mixed and reacted with $Na_2S$ in at least part of the white liquor to form sodium polysulfide. The polysulfide liquor and any remaining white liquor are returned to the digester.

The desulfurized liquor from the stripping operation is subjected to an oxidizing-decomposing operation to oxidize residual sulfides and decompose residual $NaHCO_3$. The pH of the so treated liquor is then increased to about 12.5 by the addition of makeup NaOH and recycled and separately oxidized white liquor. The resulting mixture is then evaporated to about 50 percent dry solids concentration. Finally, direct contact evaporation and combustion of the spent liquor occur as in convention kraft chemical recovery systems. Means for recovering all sulfur compounds in vent gases and condensates from all mill process units are included to reduce air and water pollution.

15 Claims, 3 Drawing Figures

POLLUTION CONTROLLED POLYSULFIDE RECOVERY PROCESS

CROSS-REFERENCE

The present invention constitutes a modification of the system and method disclosed in the copending patent application of the present inventors Ser. No. 45,455 filed June 11, 1970, also entitled "Pollution Controlled Polysulfide Recovery Process."

BACKGROUND OF THE INVENTION

The pulping of wood by the polysulfide process is a known process that has been given much attention in recent years due to the higher yield of pulp from wood than obtained with the conventional kraft pulping process at the same pulp quality. Kraft pulping is done with an aqueous solution containing NaOH and $Na_2S$. In polysulfide pulping, sulfur is added to the same type of cooking liquor under conditions permitting the formation of sodium polysulfide, $Na_2S_x$. The improvement in pulp yield over the conventional process is on the order of 10 to 14 percent and since raw wood is the major cost item in pulp production, the economic incentives to develop the process are obvious.

The initial sulfur charge in polysulfide pulping may be more than three times higher than that of kraft and the spent liquor cannot undergo normal kraft evaporation and combustion without serious consequences. As examples, there would be an intolerable level of $H_2S$ release in the mill operation causing an air and water pollution problem and there would also be increased corrosion and decreased capacity in the multiple-effect evaporators. Also, there would be increased corrosion problems in the chemical recovery furnace as well as increased explosion hazards due to the high sulfidity. These problems plus sulfur losses would make the system impractical.

SUMMARY OF THE INVENTION

The present invention is therefore directed to a practical chemical recovery system for use with polysulfide pulping. An object of the invention is to remove sulfur from the spent liquor prior to combustion in a chemical recovery furnace and to use this sulfur for producing fresh polysulfide cooking liquor. A further object is to prevent as much sulfur loss as possible thus preventing air and water pollution. These and other more detailed objects which will be more fully explained hereinafter are accomplished at least in part by means of the following process features.

The pulp washing after digestion is carried out so as to minimize the oxidation of NaSH which minimization is necessary to maximize sulfur recovery. The spent liquor is then pre-evaporated and mixed with a recycle stream containing $NaHCO_3$ and $Na_2CO_3$ so as to bring up the bicarbonate concentration to lower the pH for soap skimming and to bring up the carbonate concentration for the carbonation and $H_2S$ stripping steps. Following the soap skimming are the carbonation and $H_2S$ stripping steps. This is accomplished by passing lime kiln flue gas or similar $CO_2$-containing gas through the carbonating tower and another $CO_2$-containing gas, such as the recovery furnace flue gas, through the stripping tower. The effluent gas from these two towers containing the released $H_2S$ and the exit air stream from the decomposition step referred to below are jointly processed, such as in a liquid catalyst reactor, to convert the $H_2S$ to elemental sulfur for the production of polysulfide cooking liquor. The liquor stream is then contacted with air to decompose the $NaHCO_3$ to $Na_2CO_3$ and oxidize residual sulfides to thiosulfates. The liquor is then processed in the conventional manner to produce white liquor and to obtain lime kiln flue gas. Other features of the invention include controlling the concentration and pH so as to minimize or avoid process difficulties and recovering sulfur-containing gas or liquid streams which otherwise might cause pollution. These and other objects and advantages will be more apparent from the detailed description which follows.

DETAILED DESCRIPTION OF THE PREFERRED EMBODIMENT

Digestion

Wood chips such as loblolly pine chips, polysulfide liquor and white liquor are fed to the digester 12 along with any recycled spent black liquor necessary for fill. The preferred amount of polysulfide sulfur in the cooking liquor mixture amounts to about 4 percent by weight (dry basis) of the wood. The maximum practical amount of polysulfide sulfur is about 7 percent and the invention is operable to any amount of polysulfide up to this maximum. The polysulfide digestion process may be carried out either in a batch or continuous type operation. The digestion products are fed to a blow or flask tank 14 in which vapors are released. The vapor streams from both the digester 12 and the blow tank 14 contain sulfur compounds primarily in the form of hydrogen sulfide and mercaptans. The quantity of released sulfur compounds would be considerably higher than for a kraft digestion process. These vapors are thereafter fed to one or more condensers 16 where condensibles are removed and then to a vapor sphere 18 for storage and further processing.

Pulp Washing

In conventional kraft processes, the pulp undergoes a countercurrent washing operation to obtain a clean pulp product and a spent liquor at a relatively high concentration of dissolved nonpulp wood fractions and used chemicals. This washing is generally done in a three- or four-filter drum system having an open exhaust hood for vapor outlet which permits air entry. The liquor in a pulp washer contains a considerable amount of NaSH. In an open hood washing operation, a substantial amount of this NaSh is oxidized to $Na_2S_2O_3$. This is desirable in a kraft process since it fixes part of the sulfur in a nonvolatile form which does not produce $H_2S$ in the evaporators downstream. The liquor coming from a polysulfide pulp process contains two to three times more NaSH than in the case of the kraft process. The successful operation of the present polysulfide sulfur recovery system requires that the amount of NaSH which is oxidized to $Na_2S_2O_3$ be minimized. Otherwise, an unreasonably high amount of $Na_2S$ would have to be present in the cooking chemicals in order to obtain sufficient NaSH for conversion to $H_2S$ and subsequently to sulfur, since the $Na_2S_2O_3$ remains intact during the disclosed process and does not contribute to $H_2S$ formation.

Figure 2:
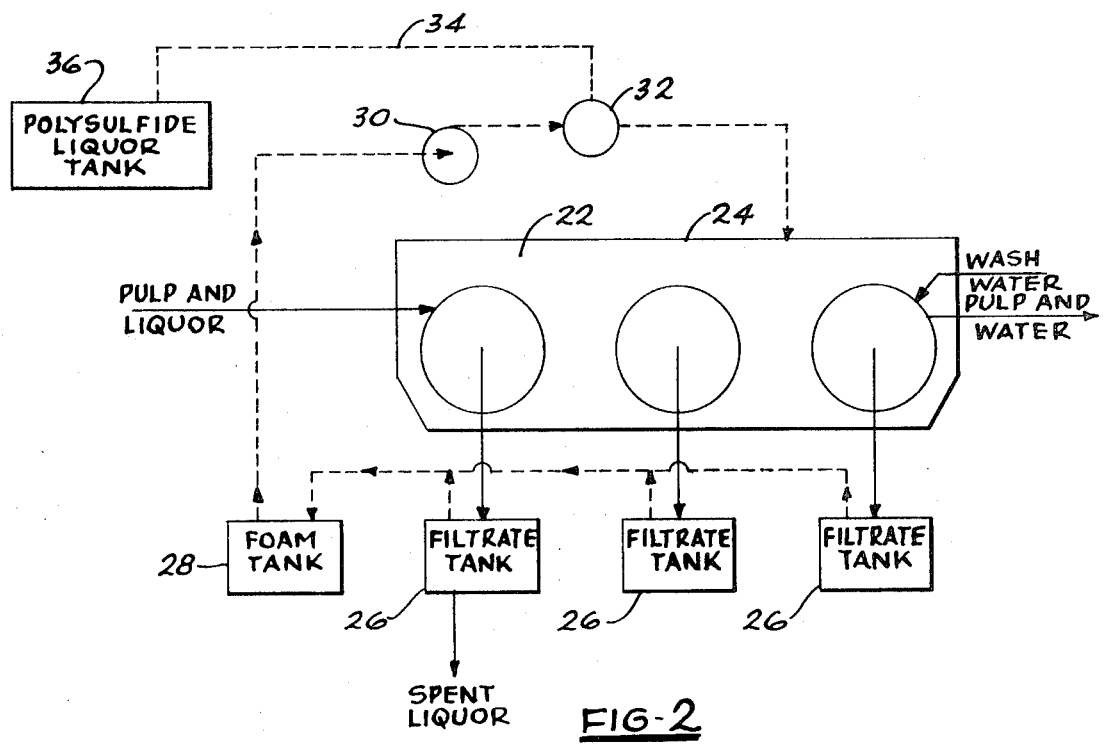
FIG. 2 is a flow diagram of the pulp washing portion of the system.

Therefore, a pulp washing system 20 is employed as illustrated in detail in FIG. 2. This system includes a pulp washer 22 which is illustrated as having three filter drums. This pulp washer is totally enclosed by the hood 24 to essentially avoid any air infiltration. The filtrate from the drum washers is fed to individual filtrate tanks 26 in a countercurrent operation and the spent liquor discharged to the next operation as will be described hereinafter. The vapors from the filtrate tanks are fed to a foam tank 28 and then recycled by means of the blower 30 through vapor surge tank 32. As also illustrated in FIG. 2, the vapor surge tank 32 is connected by means of the surge line 34 with the polysulfide liquor tank 36. This is for the purpose of blanketing the polysulfide liquor in its storage tank with nitrogen and water vapor to prevent oxidation of polysulfide to inactive thiosulfate.

This totally enclosed pulp washing system would have to operate for an initial short period (1–2 hours) to exhaust the oxygen inventory of the washing system. The oxygen would be exhausted by reacting with some of the NaSH present during this initial period. After this period, the vapor would be essentially nitrogen and water vapor thus preventing further oxidation.

A secondary beneficial effect of enclosing the pulp washer is a reduced heat consumption. Generally hot water at 55°–60° C. is fed to the last filter drum as wash water. With an open hood design, flash evaporation of water from the liquor occurs which keeps the temperature of the filtrate liquor leaving the first filter drum at about 85° C. At higher temperatures, the barometric leg suction principle applied to this type of washing operation would not function. With the totally enclosed system, such evaporation and heat loss would not occur. Therefore, in order to keep the temperature of the discharged spent liquor from going about 85° C., the wash water temperature must be reduced to about 35°–40° C. A further advantage of the enclosed washing system is the elimination of $H_2S$ discharge to the atmosphere such as occurs in an open system. An additional benefit to be realized from enclosing the pulp washer is that the brightness of the pulp would be increased. The lignin still remaining undissolved in the pulp, if oxidized in the presence of black liquor results in a reduction of brightness. Elimination of oxygen prevents this from occurring and increases the pulp brightness.

Pre-Evaporation

The spent liquor from the pulp washing operation 20, after any necessary portion has been recycled to the digester 12, is fed to the pre-evaporators 38 which may consist, for example, of the last four stages of a six-stage multiple-effect evaporator system. The purpose of evaporation in a pulp mill chemical recovery system is to concentrate the organic and inorganic constituents so that the liquor may be burned in the chemical recovery furnace. The purpose of the pre-evaporation step at this point in the present invention is to create optimum conditions for two subsequent steps in the polysulfide sulfur recovery process, namely $CO_2$ absorption and $H_2S$ stripping. This pre-evaporation concentrates the NaSH and $Na_2CO_3$ which increases the reaction rate of the subsequent processing steps and reduces the size of the necessary equipment. Also, soaps can be effectively separated from the spent liquor after it has been pre-evaporated to 25–30 percent dry solids. This soap separation facilitates the following processing steps because of lessened foaming tendencies. The pre-evaporation also gives a relatively high liquor specific gravity, 1.12–1.15, and a reasonably low viscosity, about 2 centipoise. The higher specific gravity results in the easier collapse of any foam that is generated and the viscosity is low enough for obtaining good chemical mass transfer in the $CO_2$ absorption and $H_2S$ stripping operations.

Figure 3:
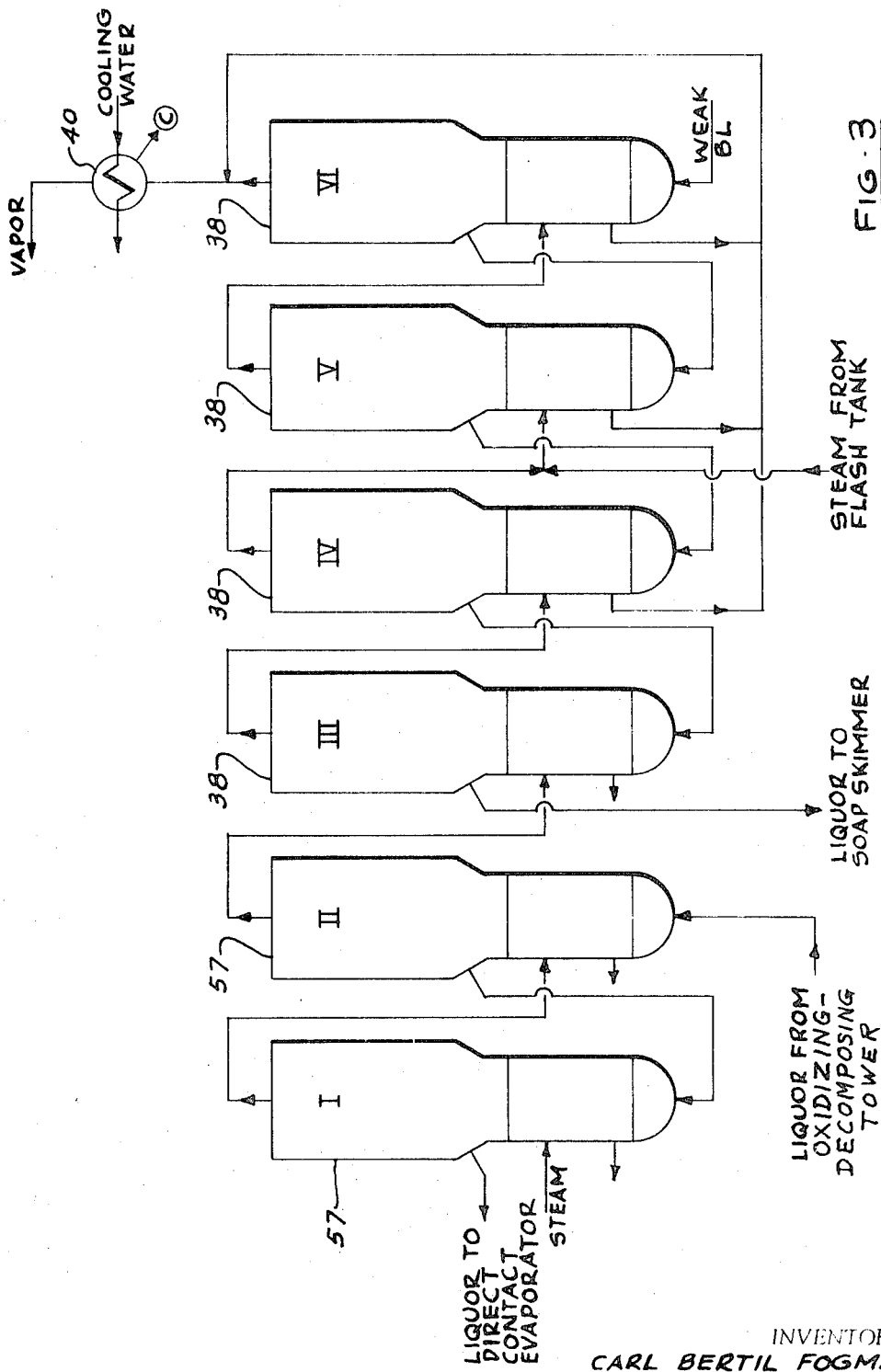
FIG. 3 is a flow diagram of the multiple-effect evaporator system.

The pre-evaporation as well as the final evaporation sections are shown in more detail in FIG. 3. The function of the final evaporation section in the overall process will be described in more detail hereinafter. The weak black liquor from the pulp washing system 20 at a concentration of about 15–18 percent dry solids is fed to Stage VI of the countercurrent flow, multiple-effect evaporator system. The vapor from this Stage VI, which contains some $H_2S$, is fed to a condenser 40. The condensate C from the condenser is fed to a condensate treating system which will also be described hereinafter. The vented vapors from the condenser 40 are combined with the vapors from the vapor sphere 18 for processing in the sulfur recovery system.

Stages III through VI of the multiple-effect evaporators are employed in the pre-evaporation section. The liquor flows from Stage VI to Stage V to Stage IV to Stage III and then out of the evaporator system to the soap skimmer 44 at a concentration of 25–30 percent dry solids. The vapors in the pre-evaporation section flow from Stage III to IV to V and then to Stage VI. Minor continuous vapor purge from the steam chests of Stages IV, V and VI is made to release $H_2S$ through the lower part of the steam chests of the evaporator bodies. The effluent from these steam chests is conducted to condenser 40. Steam from the flash tank in the sulfur recovery system is added as part of the steam feed to Stage V.

Improved Soap Skimming and Recycle

Figure 1:
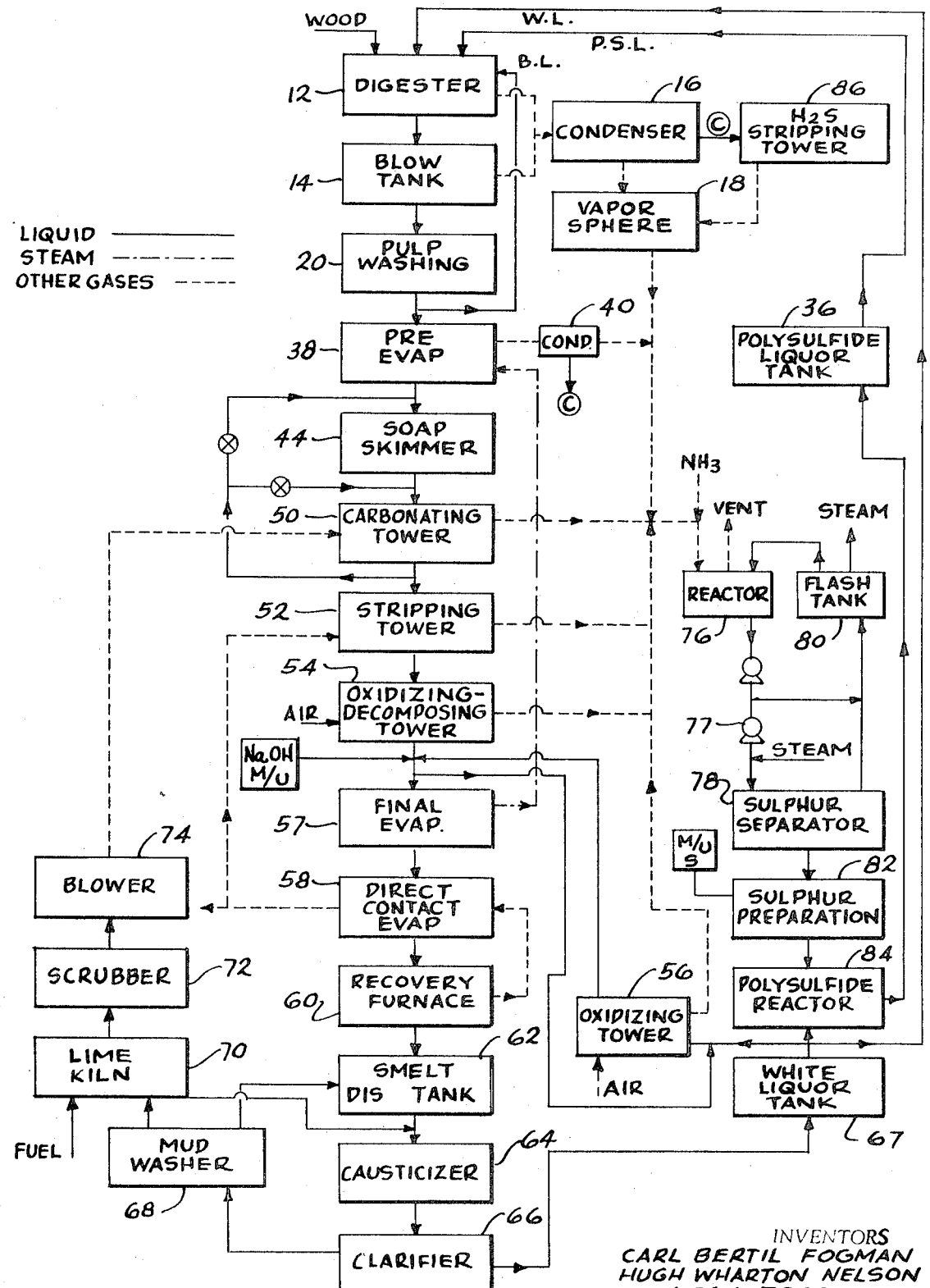
FIG. 1 is an overall process flow diagram.

The effluent from Stage III of the pre-evaporation section is fed to a conventional soap skimmer 44 which provides approximately one hour dwell time as in a normal skimming operation. The 25–30 percent dry solids concentration of this feed to the soap skimmer is most favorable to such a skimming operation. It has been found, however, that the normal soap skimming operation can be greatly improved by recycling a quantity of liquor rich in $NaHCO_3$ from the subsequent carbonation step as shown in FIG. 1. This recycle has two beneficial effects. Firstly, the $NaHCO_3$ lowers the pH which enhances soap separation. Secondly, the $NaHCO_3$ reacts with NaSH forming $H_2S$ bubbles, which facilitate flotation of soap to the surface. The amount of carbonated liquor recycled is adjusted to obtain the necessary soap separation. It has been found that a recycle of between about 50 and 400 percent of the incoming main liquor stream is a suitable range with about 100–200 percent recycle being preferred.

The soap skimming operation in the present invention has several advantages. In passing spent liquor containing soaps through a packed column, there is a tendency for the soaps to coat the packing material. This soap coating forms a sticky surface to which the precipitated lignin readily adheres. This can very rapidly cause the packed column to plug. Effective soap removal can essentially eliminate this problem. Another problem which occurs when soaps are present in spent liquor is foaming in various operations such as gas-spent liquor contact steps including carbonation, stripping, and oxidation. This foaming problem can also be reduced by means of the improved soap skimming operation. A third benefit of the improved soap skimming is that the soap yield and consequently the tall oil yield is significantly increased.

Carbonation, Recycle and $H_2S$ Stripping

Following soap skimming, the main liquor stream is passed to the carbonating tower 50 wherein $CO_2$ is reacted with $Na_2CO_3$ to produce $NaHCO_3$ according to the following main reaction:

$$Na_2CO_3 + CO_2 + H_2O \rightarrow 2NaHCO_3 \qquad (1)$$

the $H_2S$ stripping step which follows involves a reaction of this $NaHCO_3$ with NaSH to form $H_2S$ according to the following reaction:

$$NaSH + NaHCO_3 \rightarrow H_2S + Na_2CO_3 \qquad (2)$$

Reaction (2) also takes place to a minor degree in the carbonating tower 50 and reaction (1) is an auxiliary reaction in the $H_2S$ stripping tower which serves to maintain the $NaHCO_3$ concentration.

Carbonating tower 50 as well as the stripping tower 52 is preferably a packed column although any conventional gas-liquid contact apparatus used for such operations may be employed. Lime kiln flue gas which contains about 20–25 percent $CO_2$ (dry basis), or other $CO_2$-containing gas is passed upwardly through the carbonating tower to convert the $Na_2CO_3$ in the liquor to $NaHCO_3$ according to reaction (1). The amount of lime kiln flue gas required for this operation is about 110–120 lb. moles per air dry ton of pulp. The partial pressure of the $CO_2$ in the gas passing through the carbonating tower will be greater than the $CO_2$ vapor pressure which means that there will be a driving force causing the mass transfer of $CO_2$ from the gas to the liquid. This will give a mole ratio of $NaHCO_3$ to $Na_2CO_3$ after carbonation of at least 3–4 and a mole ratio of $NaHCO_3$ to NaSH of about 1.0–2.0. The effluent gas from the carbonating tower 50 will contain some $H_2S$, excess $CO_2$ and inerts, and it is fed to the sulfur recovery system along with other gas streams as will be discussed.

A portion of the carbonated liquor discharged from the carbonating tower 50 is recycled to the soap skimmer 44 as previously discussed. A further portion of liquor from this point may be recycled back to the liquor inlet of the carbonating tower in order to maintain a high ratio of $NaHCO_3$ to $Na_2CO_3$ in the carbonating tower.

The remaining carbonated liquor stream is fed to the stripping tower 52 and is passed downwardly countercurrent to a gas stream containing $CO_2$. This gas stream is preferably a portion (perhaps 15–20 percent) of the flue gas from the chemical recovery boiler after it has passed through the direct contact evaporator. This flue gas contains a sufficient amount of inerts to strip the bulk of the H₂S from the liquor. The flow rate of the flue gas through the stripping tower is such that the partial pressure of the H₂S in the gas stream leaving the stripping tower will be lower than the liquid vapor pressure of H₂S entering this tower. This amount of flue gas might be on the order of 100–150 lb. moles of furnace flue gas per ADT of pulp. There will be little or no decomposition in the stripping tower of the NaHCO₃ previously formed due to the presence of CO₂ in the stripping gas which essentially will keep the reaction (1) equilibrium at its established level. This assures an excess of NaHCO₃ as a chemical driving force according to the following equation:

$$vp_{H_2S} = K \frac{(HCO_3^-)(SH^-)}{(CO_3^=)}$$

The effluent gas from the stripping tower 52, which contains the major portion of the H₂S released from the liquor, is joined with the other sulfur containing gas streams and fed to the sulfur recovery system. The stripping, carbonating, oxidizing-decomposing, and sulfur recovery operations are all operated at about the same temperature, 170° F., which is equal to the dew point of the flue gas streams thus avoiding any vaporization or condensation. Also, the stripping, carbonating and oxidizing-decomposing operations are operated only slightly in excess of the atmospheric pressure, perhaps 5 to 7 in. H₂O gauge, to provide the necessary driving forces. Although the process has been described as using lime kiln flue gas in the carbonating tower and chemical recovery furnace flue gas in the stripping tower, these two streams could be reversed or one flue gas source used for both operations.

Oxidation and Decomposition

The main liquor stream from the stripping tower 52 will contain NaHCO₃ and some residual NaSH. The NaSH may be partially converted to H₂S in a flue gas direct contact evaporator and as such would be released to the atmosphere. It therefore must be converted to a stable form to avoid a pollution problem. The NaHCO₃ must also be decomposed to Na₂CO₃. Both of these operations are accomplished by passing the liquor through an oxidizing-decomposing tower 54 in contact with an air stream. The following two reactions occur:

$$2NaSH + 2O_2 \rightarrow Na_2S_2O_3 + H_2O \qquad (3)$$
$$2NaHCO_3 \rightarrow Na_2CO_3 + CO_2 + H_2O \qquad (4)$$

The Na₂S₂O₃ is a stable compound which will not react and release pollutants in the direct contact evaporator. A small amount of H₂S will also be produced by reaction (2) so that the effluent gas from the tower 54 is combined with the other gas streams containing H₂S for further processing. The amount of air introduced into the tower 54 is determined by the oxygen requirements of the sulfur recovery system which will be described hereinafter. This amount of air will be more than enough to provide the oxygen for reaction (3) and also to serve as a stripping agent for the CO₂ released through reaction (4).

The oxidizing-decomposing tower 54 may be a packed tower or any other suitable form of liquid gas contactor. Black liquor oxidizers have been used in the past but with soap-containing liquors they have failed due to foaming. In the present invention, however, the soaps have been removed and foaming is no longer a serious problem.

Chemical Makeup

The makeup chemical in a kraft mill is generally Na₂SO₄ in which the ratio of sodium to sulfur (Na₂:S) is equal to one. In the polysulfide pulping and recovery system, the sulfide sulfur contained in all liquor streams is substantially higher than in the case of craft. In order to abate the emission of sulfur compounds, practically every vapor and condensate stream is captured and elemental sulfur recovered for reuse in the process resulting in a chemical loss ratio (Na₂:S) of about 1.4. To achieve pollution and chemical process control as described hereinafter, sodium hydroxide is used as a makeup for sodium losses and is added to the main liquor stream after the oxidizing-decomposing step. Makeup sulfur is added to the elemental sulfur stream after sulfur recovery as explained hereinafter.

Therefore, the sulfidity of the smelt from the recovery boiler is kept at a low level reducing the odor and smelt explosion problems from this particular unit.

The liquor coming from the oxidizing-decomposing tower 54 has a pH of about 10.0–10.5 and the addition of NaOH will increase the pH. However, the amount of NaOH added for sodium makeup reasons may not be sufficient to increase the pH to a range in which the precipitated lignin will be dissolved and kept in solution through the subsequent evaporation steps. Otherwise, lignin precipitate would foul the surfaces of the evaporators. Therefore, in order to increase the pH to the desired range of 12–13, a quantity of white liquor is recycled as shown in FIG. 1. This increased pH will also prevent the release of H₂S in the following direct contact evaporation step.

The amount of white liquor recycled and the exact pH desired will depend primarily upon the type of direct contact evaporator which is used. If the evaporating gas stream is hot flue gas, which contains CO₂ that lowers the liquor pH, it will be necessary to add more white liquor to give a higher initial pH. If hot air is used in the direct contact evaporator, in which case the pH will not be lowered, less white liquor can be recycled and perhaps the recycle can even be eliminated.

The recycle of untreated white liquor as described above would introduce some Na₂S into the black liquor system. This Na₂S might also be partially converted to H₂S in a flue gas direct contact evaporator and thus must be stabilized for air pollution abatement reasons. Therefore, the white liquor recycle is subjected to a low level oxidation step in which its Na₂S is also oxidized to the stable Na₂S₂O₃. This step is carried out with air or oxygen in the oxidizing tower 56. A small amount of the main liquor stream is added to the white liquor recycle stream ahead of the oxidizer 56 to serve in a known manner as a catalyst for the oxidation reaction.

Final Evaporation

The H₂S stripped liquor after mixing with the makeup NaOH and any necessary white liquor recycle is then fed to Stage II of the multiple effect evaporator system as shown in FIG. 3. The final evaporators 57 increase the concentration of the liquor up to 50–55 percent dry solids or even higher. The vapors from Stage II of the final evaporation section are used to heat Stage III of the pre-evaporator section while the vapors from Stage I of the final evaporation section are used to heat Stage II.

Direct Contact Evaporation

The liquor discharged from Stage I of the final evaporation system is fed to a direct contact evaporator such as a conventional cascade evaporator in which water is evaporated from the liquor by direct contact with the flue gases from the recovery boiler. Another type of direct contact evaporator which can be used in the air cascade evaporator in which air, which has been heated by heat exchange with the flue gases, is used for the evaporation instead of flue gases. In this case, the liquor would not be contacted with the flue gas CO₂ and its pH would not be lowered. Therefore, as described above, it might be possible to reduce or eliminate the white liquor recycle. With the air cascade evaporator, the oxidizing tower 56 can also be eliminated.

The liquor is concentrated in this evaporator from 50–55 percent to about 70 percent dry solids concentration producing a liquor suitable for burning. Due to the low content of NaSH and Na₂S in the liquor at this point and the high pH, the emission of H₂S from the direct contact evaporator by reaction with CO₂ will be close to nil. Under certain conditions H₂S discharged from the recovery furnace could be partially absorbed in this evaporator contributing to the reduction in air pollution by H₂S. A portion of the flue gas from the direct contact evaporator is used in the stripping tower 52 or the carbonating tower 50 as previously discussed and the remainder is discharged.

Recovery Furnace

The liquor from the direct contact evaporator is next fed to a conventional chemical recovery furnace 60 with steam boiler discharging a smelt consisting mainly of Na₂S and Na₂CO₃ and a flue gas which generates steam in the boiler section of the furnace. The sulfidity of the smelt is about 25 percent, which is normal as compared to conventional kraft units. A higher sulfur-to-sodium ratio in the feed liquor to a chemical recovery furnace would cause corrosion problems and greatly increase the chances of dangerous smelt-water explosions. The flue gases from the chemical recovery furnace are used either directly or indirectly to carry out the evaporation in the direct contact evaporator and a portion then used as indicated above and in FIG. 1.

Smelt Processing

The smelt from the chemical recovery furnace is handled in much the same manner as in the conventional kraft process. The smelt is dissolved in an aqueous solution in tank 62 producing what is commonly called the green liquor. The green liquor from the smelt dissolving tank together with calcium oxide from the lime kiln is then reacted in the causticizer 64 to form conventional white liquor which is then clarified at 66. The white liquor from the clarifier is drained off into the white liquor storage tank 67 and a portion recycled to the H₂S stripped black liquor stream as needed and discussed above. The solid precipitate from the clarifier 66 containing mostly CaCO₃ is conducted to the washer 68 in which the CaCO₃ is washed. The wash water is then used to dissolve the smelt in tank 62. The CaCO₃ from the washer is next fed to the lime kiln 70 in which the CaCO₃ is converted to CaO and CO₂. The CaO from the lime kiln 70 is then recycled to the causticizer 64.

The gases from the lime kiln 70 containing primarily CO₂ and N₂ are passed to a wet scrubber 72 for the removal of particulate matter and the major part of any SO₂ present and then passed by means of the blower 74 into the carbonating tower 50 or the stripping tower 52.

Sulfur Recovery

The vapors from the stripping tower 52, the carbonating tower 50, the pre-evaporators 38, the vapor sphere 18, the oxidizing-decomposing tower 54 and the oxidizing tower 56 are mixed as shown in FIG. 1. The mixture containing about 1-3 percent H₂S and 3-10 percent O₂ by volume is passed to the sulfur recovery system in which the hydrogen sulfide is converted to elemental sulfur. Since the percentage of H₂S is so small, recovery processes such as the well-known Claus process cannot be used. In the present invention, the conversion of the H₂S to elemental sulfur is accomplished by the oxidation of the H₂S with air in the presence of a liquid catalyst. Suitable material for this purpose is a product sold under the trademark "Cataban" by Rhodia Inc. This material is an organic chelated iron compound of the general formula $Fe(x)Cl_3$ wherein $x$ is an amino complex chelating group. The ferric ion oxidizes the H₂S and is readily regenerated by O₂ according to the following reactions:

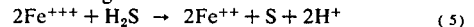
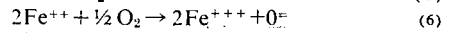

The commercial solution of "Cataban" contains about 11 percent FeCl₃ as such and it is diluted for the purposes of the present invention by the factor 10-20. Ferrous ions can be regenerated to ferric ions by oxygen at a pH above 7. However, under these conditions, normal iron compounds are in the form of insoluble hydroxides in which case the regenerating reaction would be impractically slow. This is overcome through the use of the chelating agent which permits the catalytic material to remain in the dissolved state at a pH range of 5-9. The desired pH for the purpose of the present invention is 7-8.5 and this pH may be maintained if necessary by injecting NH₃, about 0.01 percent by volume, into the gas stream entering the reactor 76. This reactor may take the form of a packed tower or any other suitable form of liquid gas contact apparatus. The fresh liquid catalyst material is introduced into the top of the reactor 76 and flows downwardly co-current to the gas stream. The exiting gas stream which is now free of oxidizable sulfur compounds can be vented to the atmosphere. The reactor 76 operates at a temperature of about 170° F. at the top and 190° F. at the bottom The liquid catalyst containing the formed sulfur as a semicolloid is withdrawn from the bottom of the reactor 76, The main portion of this stream is recycled to the reactor 76 while a bleed stream is pressurized by the pump 77 and directly injected with steam to reach a temperature of about 250° F. which is above the sulfur fusion point (241° F.). The heated stream is then introduced into the sulfur separator 78 in which the molten sulfur, which has a specific gravity of 1.85 as compared to 1.02-1.04 for the liquid catalyst, is discharged from the bottom. Any mercaptans present in the gas feed to the reactor 76 would be oxidized to dimethyldisulfide which under the operating conditions would follow the molten sulfur stream.

Since the above conversion of H₂S to elemental sulfur is an exothermic reaction and since heat and water are being added by steam injection, it is necessary to remove both heat and water to maintain the system in balance. Therefore, the supernatant liquid catalyst from the sulfur separator 78 together with the main recycle portion of the liquid catalyst from the bottom of the reactor 76 is fed to the flash tank 80. Steam is flashed from the recycling liquid catalyst stream which serves essentially to adjust the liquid temperature to 170° F. at the inlet of reactor 76. The flashed steam at about 170° F. from the flash tank 80 is employed in the steam chest of Stage V of the multiple-effect vacuum evaporator system as shown in FIG. 3. The liquid catalyst is then fed from the flash tank 80 back to the reactor 76 to complete the cycle.

Although the invention has been described with reference to "Cataban" as the liquid catalyst, other materials can be used. One alternative liquid catalyst is a sodium carbonate solution containing potassium ferricyanide. The ferricyanide oxidizes the H₂S and sulfur is precipitated. Another catalyst is a solution of sodium dithioarsenate which reacts with H₂S to yield the trithioarsenate from which sulfur can be separated by aeration. Also, as an alternative to the separation of the sulfur from the liquid catalyst in the molten state, the solid sulfur could be filtered by the use of conventional filtering apparatus.

Polysulfide Production

The molten sulfur from the sulfur separator 78 together with molten makeup sulfur is subjected to cooling, prilling and crushing in the sulfur preparation section 82. As the molten sulfur drawn from the sulfur separator will contain dimethyldisulfide, it is essential that the prilling operation be combined with a small recovery unit (not shown) consisting of a condenser and tank for stripping off the dimethyldisulfide as a salable byproduct. The air from the prilling operation and condenser containing residual dimethyldisulfide is used as part of the combustion air to the recovery boiler. The sulfur is then metered along with the white liquor to the polysulfide reactor system 84 in which the mixture is circulated between a mixer and settler during which the sulfur is reacted with sodium sulfide in the white liquor to produce polysulfide according to the following reaction.

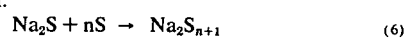

wherein "$n$" is normally 1-4, preferably 1.0-2.5. The amount of polysulfide produced in this conventional reaction will depend upon the various proportions of sulfur to white liquor and various operating conditions in the digester 12. The polysulfide liquor is then fed to tank 36 for storage under oxygen-free blanket in preparation for use in pulping. Instead of processing the molten sulfur by cooling, prilling and crushing, other techniques for sulfur admixture to the white liquor to produce polysulfides may be used such as reacting the molten sulfur directly with the white liquor.

Pollution Control

Odorous pollutant sulfur compounds are generated in a polysulfide pulp-producing mill at a rate 5 to 6 times larger than in a kraft mill. This requires that measures be taken to prevent air and water pollution. This is accomplished according to the present invention by collecting all such streams and recovering the sulfur compounds. For example, the gases from the digester 12, the blow tank 14, the pre-evaporators 38, the carbonating tower 50, the stripping tower 52, the oxidizing-decomposing tower 54 and the oxidizing tower 56 are sent to the reactor 76 for the conversion of sulfur compounds into elemental sulfur. The condensates "C" from condensers 16 and 40 are sent to a condensate recovery system which includes an $H_2S$ stripping tower 86. The combined condensate is heated and stripped at 212° F. with steam, yielding a sulfur-free reusable bottoms stream and an overhead vapor. This overhead vapor is condensed and the condensate is decanted yielding raw turpentine and water both containing sulfur compounds. The turpentine fraction can be sold as such or burned in the recovery boiler 60, while the water fraction is recycled to the stripping tower 86. The vent leaving the condenser joins the digestion vents in the vapor sphere 18 for sulfur conversion in the reactor 76.

It can be seen from the above description of the invention that the problems associated with the chemical recovery of polysulfide spent liquor such as high sulfidity in the chemical recovery furnace, sulfur losses, and air and water pollution, have been overcome. The polysulfide recovery process described in the previously mentioned U.S. Pat. application Ser. No. 45,455 uses a considerable quantity of steam such as in the hot carbonate system and in the vacuum stripping tower which adds to the operating costs. The steam is converted during processing to hot water. This hot water, however, can be used to advantage to replace a live steam consumption in the bleach plant of a mill producing bleached pulp thus minimizing any economic disadvantage of the high steam consumption. But if unbleached pulp is being produced, the hot water cannot be effectively utilized. The present invention overcomes this circumstance since considerably less steam is required. Since a gas stream lean in $CO_2$ may be used, no hot carbonate system is needed and the stripping is accomplished with a $CO_2$ containing flue gas rather than steam.

While the foregoing description has specifically referred to the production of pulp from loblolly pine, it will be apparent that the present invention is fully applicable to the treatment of other cellulose fiber materials such as all the species of wood used in the pulp industry as well as the annual crops in the form of bagasse, straw and the like.

While preferred embodiments and alternatives of the invention have been shown and described, it will be understood that they are merely illustrative and that changes may be made without departing from the scope of the invention as claimed.

We claim:

1. In a method of processing the NaSH and $Na_2CO_3$-containing spent liquor from a polysulfide pulping process which produces digested pulp including the steps of washing said spent liquor from the digested pulp in a substantially oxygen-free atmosphere so as to minimize the oxidation of NaSH, adding a $NaHCO_3$-containing recycle stream to said spent liquor to lower the pH, skimming soap from said spent liquor, carbonating said spent liquor with a $CO_2$-containing gas stream to convert $Na_2CO_3$ to $NaHCO_3$ which reacts with said NaSH to form $H_2S$, separating said $H_2S$ from said spent liquor, adding NaOH to said spent liquor for sodium makeup, and processing said spent liquor by evaporation and burning to produce white liquor containing NaOH and $Na_2S$, the improvements comprising:
   a. separating said $H_2S$ by contacting said carbonated spent liquor with a flue gas stream containing $CO_2$ and inerts, said $CO_2$ in said flue gas reacting with $Na_2CO_3$ remaining in said spent liquor to produce additional $NaHCO_3$ and said inerts stripping said $H_2S$ from said liquor;
   b. contacting said stripped spent liquor with an oxygen-containing gas stream prior to said addition of NaOH whereby residual NaSH is oxidized and whereby $NaHCO_3$ is decomposed to $Na_2CO_3$, the effluent gas stream from said contacting step containing residual oxygen;
   c. collecting the effluent gas streams from the carbonating, stripping, and oxidizing-decomposing operations to form a combined gas stream containing $H_2S$ and oxygen;
   d. contacting said combined gas stream with a liquid catalyst whereby said $H_2S$ will react with said oxygen in said combined gas stream to produce elemental sulfur;
   e. separating said elemental sulfur from said liquid catalyst; and
   f. reacting said separated elemental sulfur with at least a portion of said white liquor to produce polysulfide cooking liquor.

2. A method according to claim 1 and further including the step of pre-evaporating said spent liquor subsequent to said washing step and prior to $NaHCO_3$ addition.

3. A method according to claim 2 and further including the step of recycling an additional stream of carbonated spent liquor to the soap skimmed spent liquor.

4. A method according to claim 1 wherein said step of processing said spent liquor to produce white liquor additionally produces a lime kiln flue gas stream containing $CO_2$ and wherein said carbonating step comprises contacting said lime kiln flue gas stream with said spent liquor.

5. A method according to claim 1 wherein the step of processing said spent liquor by burning produces a furnace flue gas stream containing $CO_2$ and inerts and wherein the step (a) of separating said $H_2S$ comprises the step of contacting said furnace flue gas stream with said spent liquor.

6. A method according to claim 5 wherein said step of processing said spent liquor to produce white liquor additionally produces a lime kiln flue gas stream containing $CO_2$ and wherein said carbonating step comprises contacting said lime kiln flue gas stream with said spent liquor.

7. A method according to claim 5 wherein said step of processing said spent liquor by evaporation includes the step of contacting said furnace flue gas with said spent liquor to cause evaporation and thereafter contacting said furnace flue gas with said spent liquor as recited in step (a) to separate said $H_2S$.

8. A method according to claim 7 wherein said carbonating step, said separating step (a) and said contacting step (b) are carried out at a temperature corresponding to the dew point of said flue gas stream and at a pressure only slightly in excess of atmospheric pressure.

9. A method according to claim 8 wherein said temperature is about 170° F. and said pressure is about 5 to 7 inches of water above atmospheric pressure.

10. A method according to claim 1 wherein said NaOH is added to said spent liquor after step (b) and prior to said processing of said spent liquor and further including the step of recycling a quantity of white liquor to said spent liquor also after step (b) and prior to said processing of said spent liquor such that the pH of said spent liquor is increased to prevent lignin precipitation during subsequent processing.

11. A method according to claim 10 and further including the steps of oxidizing the $Na_2S$ in said recycle white liquor by contact with an oxygen-containing gas stream and collecting and combining the effluent gas stream from said oxidizing step with said effluent gas streams recited in step (c).

12. A method according to claim 11 including the step of adding a quantity of spent liquor to said recycle white liquor prior to oxidizing said white liquor, said quantity of spent liquor serving as a catalyst for the oxidation of $Na_2S$.

13. A method according to claim 1 wherein steps (d) and (e) comprise the steps of:
   g. passing said combined gas stream co-currently in contact with said liquid catalyst to convert said $H_2S$ to elemental sulfur;
   h. separating said liquid catalyst and elemental sulfur from residual gases;
   i. injecting steam into at least a portion of said liquid catalyst and said elemental sulfur sufficient to raise the temperature above the sulfur melting point;
   j. permitting said molten elemental sulfur to settle from said liquid catalyst;
   k. separating said molten elemental sulfur from said liquid catalyst;
   l. flashing said liquid catalyst to remove steam and heat; and
   m. returning said liquid catalyst to step (g).

14. A method according to claim 13 wherein said molten elemental sulfur from step (k) is solidified prior to reacting said elemental sulfur with said white liquor in step (f).

15. A method according to claim 13 wherein said step (f) comprises reacting said molten elemental sulfur directly with said white liquor.

* * * * *